United States Patent
Huhnen et al.

(10) Patent No.: US 12,123,761 B2
(45) Date of Patent: Oct. 22, 2024

(54) DEVICE AND METHOD FOR WEIGHING FILLED CAPSULES

(71) Applicant: Harro Hofliger Verpackungsmaschinen GmbH, Allmersbach im Tal (DE)

(72) Inventors: Florian Huhnen, Allmersbach im Tal (DE); Steffen Gall, Allmersbach im Tal (DE); Jonathan Cocks, Allmersbach im Tal (DE); Reiner Wurst, Allmersbach im Tal (DE)

(73) Assignee: Harro Höfliger Verpackungsmaschinen GmbH, Allmersbach im Tal (DE)

( * ) Notice: Subject to any disclaimer, the term of this patent is extended or adjusted under 35 U.S.C. 154(b) by 364 days.

(21) Appl. No.: 17/854,238

(22) Filed: Jun. 30, 2022

(65) Prior Publication Data

US 2023/0020087 A1 Jan. 19, 2023

(30) Foreign Application Priority Data

Jun. 30, 2021 (EP) .................................. 21 182 828

(51) Int. Cl.
- *G01G 13/02* (2006.01)
- *A61J 3/07* (2006.01)
- *B07C 5/18* (2006.01)
- *G01G 17/00* (2006.01)
- *G01G 21/22* (2006.01)

(52) U.S. Cl.
CPC .............. *G01G 13/02* (2013.01); *G01G 17/00* (2013.01); *G01G 21/22* (2013.01); *A61J 3/074* (2013.01); *A61J 2200/74* (2013.01); *B07C 5/18* (2013.01)

(58) Field of Classification Search
CPC ......... A61J 3/074; A61J 2200/74; B07C 5/16; B07C 5/18; G01G 13/02; G01G 17/00; G01G 21/22
See application file for complete search history.

(56) References Cited

U.S. PATENT DOCUMENTS

| | | | |
|---|---|---|---|
| 10,502,612 B2 * | 12/2019 | Kiehn | G01G 17/00 |
| 10,935,415 B2 | 3/2021 | Wurst et al. | |
| 11,692,865 B1 * | 7/2023 | Zhu | G01G 21/22 177/1 |

* cited by examiner

Primary Examiner — Randy W Gibson
(74) Attorney, Agent, or Firm — Gudrun E. Huckett

(57) ABSTRACT

A device for weighing filled capsules has a weighing unit with weighing receptacle for the capsules supplied via a feed channel to the weighing unit in a movement direction. The weighing receptacle has a stop holding a capsule with form fit in movement direction in a receptacle section of the weighing receptacle. The receptacle section relative to the horizontal is slanted such that a leading end of the receptacle section relative to the movement direction is lower than a rearward end. In the method for weighing, the capsule is held with form fit in movement direction in the receptacle section by the stop device such that the capsule is at a slant with a leading end in relation to the movement direction being lower than a rearward end of the capsule. Weighing of the capsule is done in the weighing unit while the capsule is held at the slant.

11 Claims, 2 Drawing Sheets

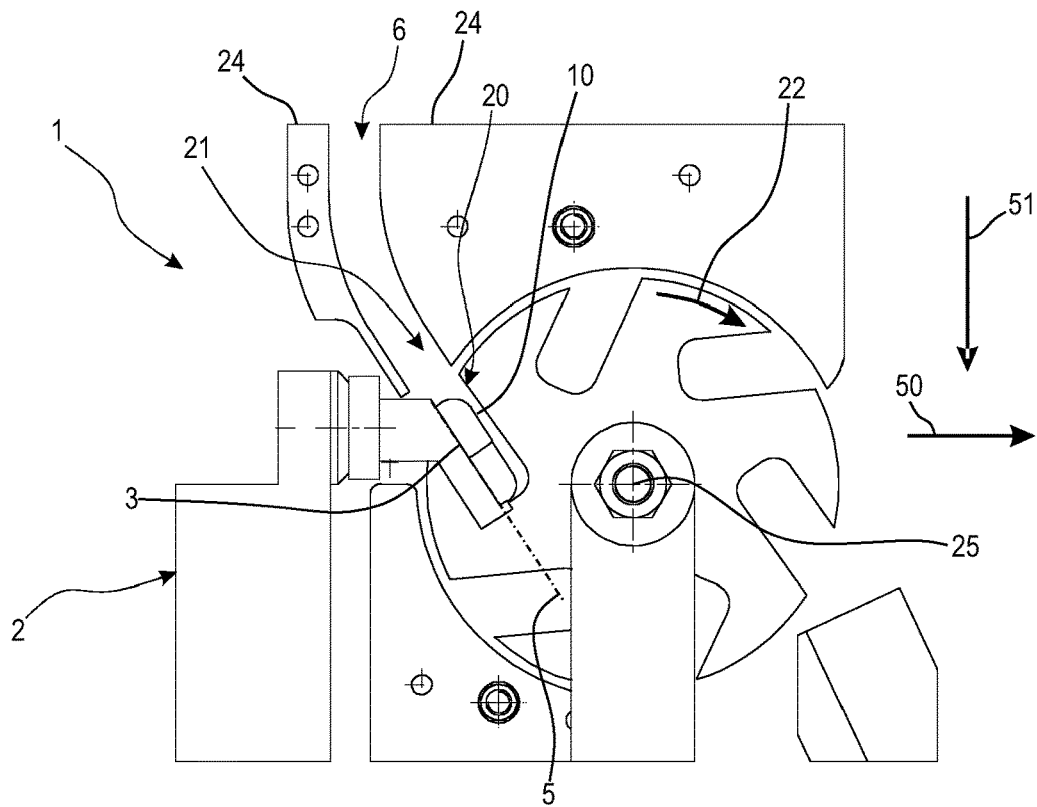
*Fig. 1*
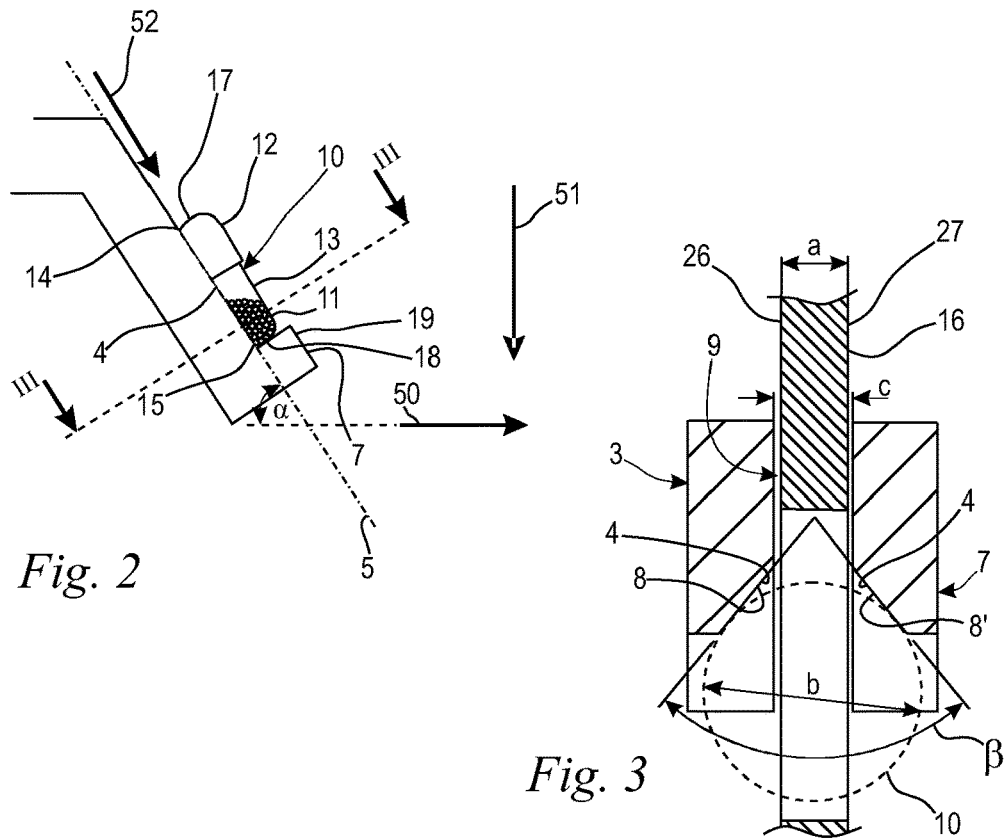
*Fig. 2*
*Fig. 3*

DEVICE AND METHOD FOR WEIGHING FILLED CAPSULES

BACKGROUND OF THE INVENTION

The invention concerns a device for weighing capsules, wherein the device comprises a weighing unit with a weighing receptacle for the capsule, a feed channel for supplying individual capsules to the weighing unit in a movement direction, and a stop device for the capsule supplied in movement direction.

The invention concerns also a method for weighing capsules by means of such a device.

In the pharmaceutical field and also in the field of dietary supplements, numerous preparations are filled into capsules that are provided to be taken orally. For various preparations, it is decisive that they are provided in a fixedly defined and exactly observed mass as a standard dose in the capsule. Suitable metering devices and methods are to ensure that very narrow mass tolerances of, for example, ±2 mg are observed under the conditions of large scale production.

Such requirements on the target mass are accompanied increasingly also by the desire for suitable testing or verification measures. For fulfilling such requirements, in particular capsule filling machines of multi-track configuration and multi-track weighing systems are used. The filled capsules are either controlled by taking random samples with regard to the correct filling quantity or, in case of a corresponding requirement, are subjected to a 100% in-process control. For this purpose, the capsules are conveyed to a multi-track capsule weighing machine. When no direct connection is existing, the capsule weighing machine can also be manually supplied. In the capsule weighing machine, the individual capsules are advanced to a weighing unit. Upon reaching the weighing unit, the capsule is stopped in its movement by means of a stop device and subsequently is placed in a horizontal position onto a weighing receptacle of the weighing unit. Here, a test weighing of the filled capsule is then performed before it is transported farther and replaced by the following capsule at the weighing device.

It has been found that weighing performed in this way represents the limiting factor with regard to throughput speed and output quantity. The respective capsule must be resting absolutely still on the weighing receptacle for an exact and repeatable weight measurement within the milligram range. The capsule which is supplied at high speed must thus be first braked, i.e., stopped and then precisely deposited, before the actual weighing can be performed. A high acceleration is then required again for a fast further transportation. In order to have, despite of this, a sufficiently long phase of rest for the measurement, the number of cycles of the machine as a whole must not surpass a certain value. An increase of the output quantity can be achieved under these conditions only by increase of the number of machine tracks which further increases the already high investment costs for the weighing device.

SUMMARY OF THE INVENTION

The invention has the object to further develop a device of the aforementioned kind for weighing filled capsules in such a way that a precise weighing even for shorter cycle times is possible.

This object is solved by a device wherein the stop device is part of the weighing receptacle and is configured to hold the respectively stopped capsule with form fit in movement direction in a receptacle section of the weighing receptacle, and wherein the receptacle section of the weighing receptacle in relation to a horizontal direction is slanted such that an end of the receptacle section leading in relation to the movement direction is positioned lower than a rearward end of the receptacle section.

The invention has furthermore the object to provide a faster method for weighing capsules.

This object is solved by a method comprising the following steps:
a capsule filled at least partially with the fill is supplied by means of a feed channel in a movement direction to the weighing unit;
when reaching the weighing unit, the capsule is stopped from its movement in the movement direction by means of a stop device;
the stopped capsule is held with form fit in movement direction in a receptacle section of the weighing receptacle by the stop device in such a way that an end of the capsule leading in relation to the movement direction is lower than a rearward end of the capsule;
the capsule held at a slant is weighed.

The invention is based initially on the recognition that capsules with different degree of filling react with different sensitivity to shortening of the weighing cycle times. Thus, it was recognized initially that completely filled capsules can be weighed exactly in a relatively short time while partially filled capsules in comparison require a longer period of time for this purpose. This led to the further recognition according to the invention that the fill of partially filled capsules shows still a dynamic behavior when the process of braking and depositing of the capsule on the weighing receptacle has essentially already been completed. As a result of the initially acting deceleration during stopping, the fill collects at the end of the capsule that is leading in movement direction. After deposition on the weighing receptacle, the powdery or granular fill that has collected at the front in the capsule flows at least partially back onto the lower capsule wall in the weight force direction wherein, in the manner of loose bulk material, a slope at a certain slope angle is formed. This process of return flow, optionally in connection with a slope formation, takes a certain amount of time while the capsule is already lying on the weighing receptacle. As long as the fill in the interior is still moving, the measuring results of weighing are falsified. As a result, a fast and exact weighing of the entire capsule can be performed only when, firstly, the fill, together with the capsule sleeve, is at rest and when, secondly, comparable rest positions can be obtained for all capsules.

Based on this, the invention provides a device in which a stop device is part of the weighing receptacle and is configured to hold with form fit the respectively stopped capsule in a receptacle section of the weighing receptacle in movement direction. This enables configuring the receptacle section of the weighing receptacle at a slant in relation to a horizontal direction in such a way that, in relation to the movement direction, a leading end of the receptacle section is positioned lower than a rearward end of the receptacle section. As a result, the capsule is also positioned in a correspondingly slanted position. During weighing of the capsule, it is held with form fit by the stop device. This configuration of the stop device enables particularly large slant angles between receptacle section and horizontal direction, without the capsule sliding away from the receptacle section. Due to the slant of the receptacle section of the weighing receptacle in accordance with the invention and the slanted position of the capsule thereon in accordance with the invention, the time span in which the fill flows or streams back from the leading stop position after stopping of the capsule can be significantly reduced. In comparison to the prior art, significantly shorter wait periods can be observed before a reliable weighing can be performed.

It is advantageously provided that the receptacle section of the weighing receptacle has a longitudinal axis, wherein the longitudinal axis of the receptacle section in relation to the horizontal direction is slanted at a slant angle. Preferably, the slant angle is in a range of 30° to 90°, preferably in a range of 45° to 75°, and in particular in a range of 50° to 60°. The larger the slant angle, the faster a rest position of the fill material is achieved. When the slant angle is selected too large, the capsule may jump out of the weighing receptacle. Therefore, a suitable slant angle is to be selected that enables a safe end position of the capsule in the weighing receptacle as well as a fast rest phase of the fill after stopping the capsule.

Preferably, the receptacle section is formed by two partial surface sections, wherein the partial surface sections, viewed in cross section of the receptacle section, are facing each other at a slant. The slant of the partial surface sections relative to each other enables an automatic centering of the capsule at the receptacle section so that capsules of different size can be positioned. Preferably, the two partial surface sections are positioned at a surface angle to each other which is in a range of 120° to 60°, in particular amounts to approximately 90°.

It is preferably provided that the two partial surface sections are separated from each other by an opening. The opening enables the capsule transporter to pass through the weighing receptacle and, in doing so, pick up the capsule from the weighing receptacle. The opening is in particular configured as a slot. In an alternative configuration, it can however also be expedient to provide other contours for the opening. The opening contour is of course to be adapted to that of the capsule transporter.

Preferably, the feed channel is configured as a drop chute. This has the result that the capsule moves along the feed channel at high speed in direction toward the weighing receptacle. In order to be able to hold the capsule in the weighing receptacle despite of this, the stop device is configured as stop of the capsule in movement direction. It is preferably provided that the device comprises a capsule transporter for sorting out the capsule. The capsule transporter can be in particular configured as a rotatable pocket wheel. This enables a constructively simple configuration of the device according to the invention.

BRIEF DESCRIPTION OF THE DRAWINGS

An embodiment of the invention is described in the following with the aid of the drawing in more detail.

FIG. 1 shows a device according to the invention for weighing capsules, holding the capsule, in a schematic end view.

FIG. 2 shows in a schematic detail end view the device according to FIG. 1 with the capsule held at the stop device.

FIG. 3 shows the weighing receptacle in a schematic section illustration along the section line illustrated in FIG. 2 in the direction of the arrows III.

DESCRIPTION OF PREFERRED EMBODIMENTS

Figure 4:
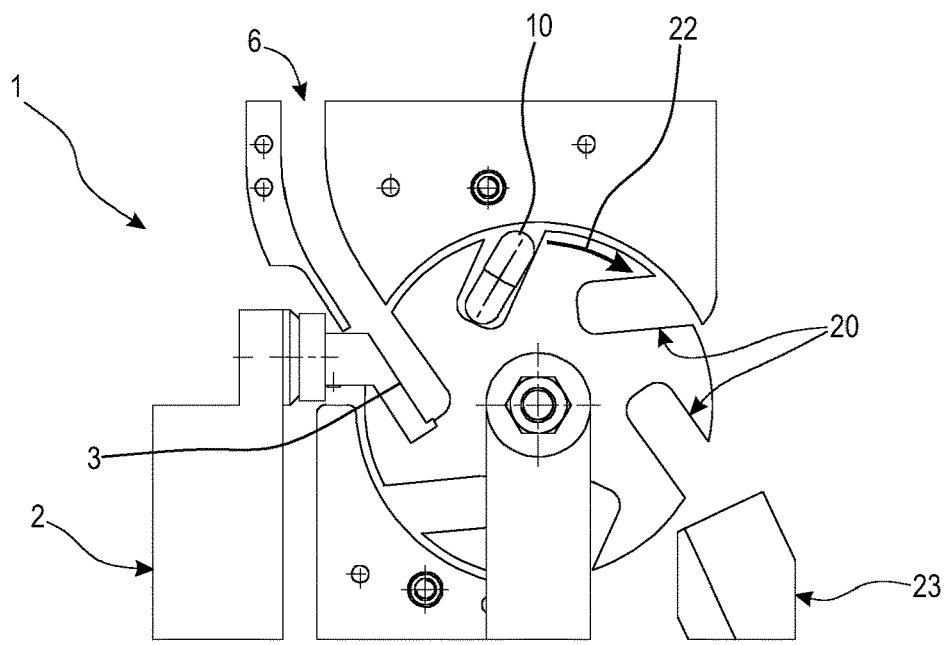
FIG. 4 shows in a schematic end view the device for weighing capsules according to FIG. 1 with the capsule received in the pocket wheel.

FIG. 1 shows an embodiment of the device 1 according to the invention for weighing capsules 10 with a fill 11. The device 1 is illustrated in usual upright operating position relative to a horizontal direction 50 and a weight force direction 51 positioned orthogonally thereto. The weight force direction 51 corresponds to the direction of the force of gravity or gravitational acceleration.

The capsule 10 to be weighed is illustrated here as a two-piece capsule with a capsule bottom part 13 and a pushed-on capsule top part 12 as an example. However, other capsule types, for example, completely closed ones, are conceivable also. The capsule 10 contains a fill 11 with graphically indicated grains (FIG. 2); accordingly, the fill is a powder, a granular material or the like. In the context of the invention, also liquids can however be provided as fill 11. In any case, fills 11 that have flowing or flow-like properties are primarily of concern. Also, in FIG. 2 it is apparent that the capsule 10 is only partially filled; accordingly, the fill 11 does not completely fill out the interior of the capsule 10. Completely filled capsules 10 can however be weighed also with the method according to the invention and the device according to the invention.

As illustrated in FIG. 1, the device comprises a weighing unit 2 with a weighing receptacle 3 for a respective single capsule 10 to be weighed. Moreover, the device 1 comprises a feed channel 6 for supplying individual capsules 10 to the respective weighing unit 2. In the embodiment, the feed channel 6 is configured as a drop chute. Accordingly, the feed channel 6 comprises such a slant relative to the horizontal direction 50 that the capsule 10 slides through the feed channel 6 to the weighing unit 2. The feed channel 6 extends all the way to the weighing unit 2 so that the capsule 10 can glide from the feed channel 6 immediately onto the weighing unit 2.

As illustrated in FIGS. 1 and 2, the device 1 comprises a stop device 7 for the capsule 10 which is supplied in movement direction 52 to the weighing unit 2. The stop device 7 is part of the weighing receptacle 3. The stop device 7 is configured to hold the stopped capsule 10 with form fit in movement direction 52 in a receptacle section 4 of the weighing receptacle 3. For this purpose, a projection in relation to the receptacle section 4 of the weighing receptacle 3 is formed at the stop device 7. The capsule 10 glides through the feed channel 6 in movement direction 52 onto the weighing receptacle 3 and is stopped with its end 18 leading in the movement direction 52 at the projection 19. Accordingly, the projection 19 of the stop device 7 forms a stop for the capsule 10 in movement direction 52. Once the capsule 10 has been stopped, its weight can be measured in the weighing receptacle 3. The projection 19 of the stop device 7 prevents in addition that the capsule 10 can glide off the weighing receptacle 3 during the weighing process.

Stopping of the capsule 10 leads also to braking of the fill 11 within the capsule 10 opposite to the movement direction 52. As a result of the acting mass forces, the fill 11 collects in the region of the leading end 18 of the capsule 10 while the rearward end 17 of the capsule 10 is free. In case of approximately horizontally positioned capsules 10, it was observed that, after stopping, the fill 11 within the capsule 10 at least partially flowed or streamed out of the region of the leading end 18 to the lower wall region of the capsule 10 in weight force direction 51. The movement of the fill 11 within the capsule 10 leads to deviations in weighing the capsule 10. This has the result that the time span until the capsule 10 after stopping is in a rest position and can be weighed with sufficient precision is increased.

As illustrated in FIG. 2, the receptacle section 4 is the region of the weighing receptacle 3 within which the capsule 10 is deposited. The receptacle section 4 extends in this context along its longitudinal axis 5. The horizontal direction 50 and the weight force direction 51 extending perpendicularly thereto, to which reference is being had here, are illustrated during normal operation as a reference for the orientation of the receptacle section 4 and of the capsule 10. It is known from the prior art that has been explained in the beginning that corresponding receptacle sections are substantially horizontally aligned, i.e., oriented parallel to the horizontal direction 50. Accordingly, the capsule 10 with its longitudinal axis is also positioned substantially horizontally on the receptacle section 4. According to the prior art, as a result of the horizontal orientation of the capsule during stopping, during transfer to the weighing unit, and while resting on the receptacle section of the weighing receptacle, a distinct repositioning of the fill within the capsule from the leading end back to the lower capsule wall takes place. As a result, a reliable weighing can be performed only after a certain calming phase of the fill.

As illustrated in FIGS. 1 and 2, the receptacle section 4 of the weighing receptacle 3 is designed such that the stopped capsule 10 is arranged at a slant relative to the horizontal direction 50. The longitudinal axis 5 of the receptacle section 4 is positioned in relation to the horizontal direction 50 at a slant angle $\alpha$. As illustrated in FIG. 2, the slant angle $\alpha$ is in a range of 30° to 90°, preferably in a range of 45° to 75°, and in particular in a range of 50° to 60°. This has the result that the end 15 of the receptacle section 4 that is leading in movement direction 52 of the capsule 10 is positioned lower than the end 14 of the receptacle section 4 that is positioned to the rear in movement direction 52. At the leading end 15 of the receptacle section 4, the projection 19 of the stop device 7 is formed. As illustrated in FIG. 2, the capsule 10 with its leading end 18 is resting on the leading end 15 of the receptacle section 4 and contacts in addition the stop device 7. Moreover, the capsule 10 is positioned with its rearward end 17 on the rearward end 14 of the receptacle section 4. The larger the slant angle $\alpha$ between the longitudinal axis 5 and the horizontal direction 50, the smaller the repositioning of the fill 11 of the capsule 10 after the capsule 10 has been stopped. Accordingly, the duration of the calming phase of the fill 11 is also reduced. For this reason, the slant angle $\alpha$ according to the invention is to be selected as large as possible. This has the result that the capsule 10 in the receptacle section 4 of the weighing receptacle 3 during weighing must be held by means of the stop device 7. The friction force between the capsule 10 and the receiving section 4 of the weighing receptacle 3 is too small for such a slant angle $\alpha$ in order to be able to hold the capsule 10 without the stop device 7. Without stop device 7, the capsule 10 would slide off the receptacle section 4 in the movement direction 52. The stop device 7 is provided directly at the weighing unit 2. The stop device 7 therefore has associated therewith two tasks, namely, on the one hand, to stop the capsule 10 when it is sliding out of the feed channel 6 onto the weighing receptacle 3 and, on the other hand, to hold the capsule 10 in stopped position on the receptacle section 4 of the weighing receptacle 3 during weighing. The weighing receptacle 3 and the stop device 7 are fixedly connected to each other. In the preferred embodiment, the weighing unit 2 is a one-piece configuration together with the stop device 7.

Figure 5:
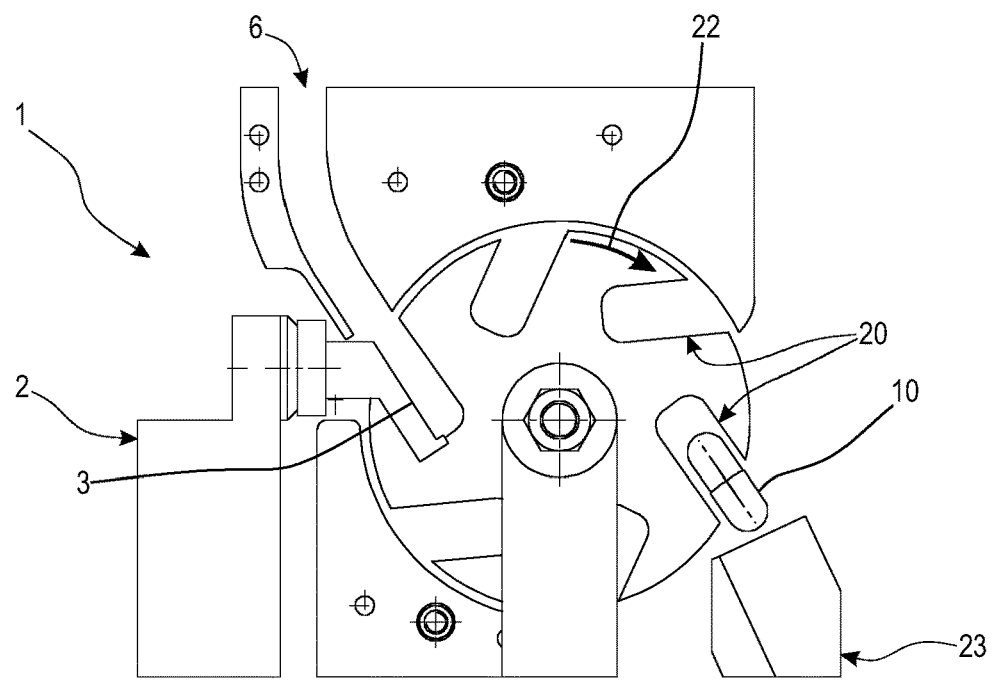
FIG. 5 shows in a schematic end view the device for weighing capsules according to FIG. 1 upon sorting out the capsule.

As illustrated in FIG. 1, the device 1 comprises a capsule transporter 16. The capsule transporter 16 picks up the capsule 10 after weighing and sorts it out. In the preferred embodiment, the capsule transporter 16 is configured as a rotatable pocket wheel. The capsule transporter 16 comprises at least one receptacle pocket 20. In the preferred embodiment, a plurality, in particular five, receptacle pockets 20 are provided at the capsule transporter 16. Upon supplying the capsule 10, the capsule transporter 16 is in an open position 21 in which the receptacle pocket 20 is aligned with the feed channel 6. Accordingly, the capsule 10 can glide into the weighing receptacle 3. The upper inner side, with respect to the weight force direction, of the receptacle pocket 20 aligned with the feed channel 6 forms an upper movement stop for the capsule 10 so that the latter in its length direction will come to rest parallel to the movement direction 52 on the receptacle section 4. After weighing, the capsule transporter rotates farther in rotational direction 22. In this context, the capsule 10 is removed from the weighing receptacle 3 and is further transported in the receptacle pocket 20 of the capsule transporter 16 (FIG. 4). Moreover, the device 1 comprises a sorting chute 23 which is arranged at the capsule transporter 16 such that the capsule 10 with corresponding rotation of the capsule transporter 16 drops from the receptacle pocket 20 into the sorting chute 23 (FIG. 5).

FIG. 3 shows a schematic section illustration of the weighing receptacle 3. The capsule 10 is illustrated schematically as a dashed circular line. As illustrated in FIG. 3, the receptacle section 4 is divided into two individual partial surface sections 8, 8'. The capsule 10 contacts the two partial surface sections 8, 8'. The two partial surface sections 8, 8', viewed in cross section of the receptacle section 4, are facing each other at a slant. The partial surface sections 8, 8' extend parallel to the longitudinal axis 5 of the receptacle section 4. The two partial surface sections 8, 8' are positioned at a surface angle $\beta$ to each other wherein the surface angle $\beta$ is smaller than 180°. In preferred embodiment, the surface angle $\beta$ is in a range of 60° to 120° and amounts to at least approximately 80° in the illustrated preferred embodiment. In this way, the capsule 10 is automatically held centered between the partial surface sections 8, 8'. Due to this configuration of the receptacle section 4, also capsules 10 of different size can be held. Moreover, an opening 9 is provided at the weighing receptacle 3. The opening 9 is configured such that the capsule transporter 16 can move through the opening 9 and, in doing so, can pick up the capsule 10. The capsule 10 is lifted off the weighing receptacle 3. As illustrated in FIG. 3, the opening 9 is formed between the two partial surface sections 8, 8'. In the preferred embodiment, the opening 9 is configured as a slot. The opening 9 can also have other contours that enable the capsule transporter 16 to remove the capsule 10 from the weighing receptacle 3.

Such weighing units 2 are extremely sensitive measuring systems that react already at minimal force action. Thus, the measuring results when weighing a capsule 10 can be falsified already due to undesired air flows that act on the weighing receptacle 3 or on the capsule 10. Therefore, in the embodiment illustrated in FIG. 1, a plurality of measures for reducing air flows at the weighing unit 2 are provided. As illustrated in FIG. 1, the device 1 comprises a housing 24 wherein the housing 24 surrounds the weighing receptacle 3. The feed channel 6 is formed in the housing 24. The housing 24 surrounds the weighing receptacle 3 in such a way that air flows from the exterior of the housing 24 can reach the weighing receptacle 3 only through the feed channel 6. Therefore, the air flows acting on the weighing receptacle 3 are reduced.

In order to reduce also the air flows that originate from the capsule transporter 16, the latter comprises a very narrow configuration. The capsule transporter 16 is supported, preferably at the housing 24, so as to rotate about its axis of rotation 25. As illustrated in FIG. 3, the capsule transporter 16 is arranged at least partially in the opening 9 of the weighing receptacle 3. The capsule transporter 16 comprises a width a which is measured in the direction of its axis of rotation 25 and extends from its first end face 26 to its second end face 27. The width a of the capsule transporter 16 is preferably less than a diameter of the capsule 10. Moreover, the width a of the capsule transporter 16 amounts to at most 75%, preferably 50%, of the diameter d of the capsule 10. Moreover, the opening 9 of the weighing receptacle 3 has a width c that is measured also in the direction of the axis of rotation 25 of the capsule transporter 16. The width c of the opening 9 is larger than the width a of the capsule transporter 16. This narrow configuration of the capsule transporter 16 has the result that the air masses which are moved by the capsule transporter 16 are minimal so that the effect on the weighing receptacle 3 is also minimal. Moreover, the capsule transporter 16 is surrounded at its end faces 26, 27 by the housing 24 such that the capsule 10, held in the receptacle pockets 20, is guided at the housing 24. In this way, the capsules 10 cannot fall out of the receptacle pockets 20 of the capsule transporter 16. As already mentioned above, the receptacle section 4 is divided into two individual partial surface sections 8, 8'. Aside from the advantage that capsules 10 can be accommodated better, a further function of the two-part division resides also in that the potential inflow surface for air flows at the weighing receptacle 3 is reduced. Thus, a plurality of potential measuring disturbances at the weighing unit can be prevented.

The invention is illustrated here in an exemplary fashion with a one-track operation with only one feed channel 6 and only one weighing unit 2. In practical operation, multi-track parallel extending embodiments can be expedient however in which a corresponding number of feed channels 6 and weighing units 2 are arranged adjacent to each other for the simultaneous and parallel testing of a plurality of capsules 10.

The specification incorporates by reference the entire disclosure of European priority document 21 182 828.0 having a filing date of Jun. 30, 2021.

While specific embodiments of the invention have been shown and described in detail to illustrate the inventive principles, it will be understood that the invention may be embodied otherwise without departing from such principles.

What is claimed is:

1. A device for weighing a capsule with a fill, the device comprising:
   a weighing unit comprising a weighing receptacle configured to receive the capsule;
   a feed channel configured to supply the capsule to the weighing unit in a movement direction;
   wherein the weighing receptacle comprises a stop device configured to stop the capsule supplied in the movement direction, wherein the stop device is configured to hold the capsule with form fit in the movement direction in a receptacle section of the weighing receptacle;
   wherein the receptacle section of the weighing receptacle in relation to a horizontal direction is slanted such that a leading end of the receptacle section leading in relation to the movement direction is positioned lower than a rearward end of the receptacle section in relation to the movement direction.

2. The device according to claim 1, wherein the receptacle section of the weighing receptacle comprises a longitudinal axis, wherein the longitudinal axis of the receptacle section in relation to the horizontal direction is slanted at a slant angle, wherein the slant angle lies in a range of 30° to 90°.

3. The device according to claim 1, wherein the receptacle section is formed by two partial surface sections, wherein the two partial surface sections, viewed in a cross section view of the receptacle section, are facing each other at a slant.

4. The device according to claim 3, wherein the two partial surface sections are positioned at a surface angle to each other, wherein the surface angle lies in a range of 120° to 60°.

5. The device according to claim 3, wherein the two partial surface sections are separated from each other by an opening.

6. The device according to claim 5, wherein the opening is a slot.

7. The device according to claim 1, wherein the feed channel is a drop chute.

8. The device according to claim 1, wherein the stop device is a stop stopping the capsule in the movement direction.

9. The device according to claim 1, further comprising a capsule transporter configured to sort out the capsule.

10. The device according to claim 9, wherein the capsule transporter is a rotatable pocket wheel.

11. A method for weighing a capsule with a fill by a device comprising a weighing unit comprising a weighing receptacle configured to receive the capsule; a feed channel configured to supply the capsule to the weighing unit in a movement direction; wherein the weighing receptacle comprises a stop device configured to stop the capsule supplied in the movement direction, wherein the stop device is configured to hold the capsule with form fit in the movement direction in a receptacle section of the weighing receptacle; wherein the receptacle section of the weighing receptacle in relation to a horizontal direction is slanted such that a leading end of the receptacle section leading in relation to the movement direction is positioned lower than a rearward end of the receptacle section in relation to the movement direction; the method comprising:
   supplying a capsule filled at least partially with the fill via the feed channel in the movement direction to the weighing unit;
   stopping the capsule when reaching the weighing unit in the movement direction by the stop device;
   holding the capsule with form fit in the movement direction in the receptacle section of the weighing receptacle by the stop device such that the capsule is held at a slant with an end of the capsule leading in relation to the movement direction being lower than a rearward end of the capsule in relation to the movement direction;
   weighing the capsule held at the slant with the weighing unit.

* * * * *